United States Patent
Wei et al.

(10) Patent No.: US 12,291,631 B2
(45) Date of Patent: May 6, 2025

(54) RECLAIMING AGENT AND RECLAIMED RUBBER

(71) Applicant: INDUSTRIAL TECHNOLOGY RESEARCH INSTITUTE, Hsinchu (TW)

(72) Inventors: Yi-Ting Wei, Zhubei (TW); Jyh-Horng Wu, Kaohsiung (TW); Yao-Zu Wu, Tainan (TW); Ming-Tsong Leu, Tainan (TW); You-Shan Cai, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 609 days.

(21) Appl. No.: 17/688,096

(22) Filed: Mar. 7, 2022

(65) Prior Publication Data
US 2023/0212383 A1     Jul. 6, 2023

(30) Foreign Application Priority Data

Jan. 6, 2022   (TW) .................................. 111100532

(51) Int. Cl.
*C08C 19/30*   (2006.01)
*C08J 11/28*   (2006.01)
*C08L 51/04*   (2006.01)

(52) U.S. Cl.
CPC .............. *C08L 51/04* (2013.01); *C08J 11/28* (2013.01); *C08J 2325/10* (2013.01); *C08L 2207/20* (2013.01)

(58) Field of Classification Search
USPC ......................................................... 521/43
See application file for complete search history.

(56) References Cited

U.S. PATENT DOCUMENTS

| | | | |
|---|---|---|---|
| 2,469,529 A | 5/1949 | Tewksbury et al. | |
| 4,148,763 A | 4/1979 | Bryson | |
| 4,440,816 A * | 4/1984 | Uffner | E01C 11/005 428/440 |
| 5,770,632 A | 6/1998 | Sekhar et al. | |
| 7,425,584 B2 | 9/2008 | McFarlane et al. | |
| 2009/0082475 A1 | 3/2009 | Zhang et al. | |

FOREIGN PATENT DOCUMENTS

| | | |
|---|---|---|
| CN | 1308097 A | 8/2001 |
| CN | 102050960 A | 5/2011 |
| CN | 101759869 B | 6/2011 |
| CN | 101113140 B | 1/2012 |
| CN | 103435842 A | 12/2013 |
| CN | 104761581 A | 7/2015 |
| CN | 104981484 A | 10/2015 |
| CN | 102731723 B | 6/2016 |
| CN | 105733021 A | 7/2016 |
| CN | 111647198 A | 9/2020 |
| GB | 575546 A | 2/1946 |
| TW | 434279-8 | 5/2001 |
| TW | I458768 A | 11/2014 |
| WO | WO01/23464 A1 | 4/2001 |
| WO | WO2014/084727 A1 | 6/2014 |

OTHER PUBLICATIONS

Taiwanese Office Action and Search Report for Taiwanese Application No. 111100532, dated Jan. 7, 2023.
Taiwanese Office Action and Search Report for Taiwanese Application No. 111100532, dated Aug. 9, 2022.

* cited by examiner

*Primary Examiner* — Terressa Boykin

(74) *Attorney, Agent, or Firm* — Birch, Stewart, Kolasch & Birch, LLP

(57) ABSTRACT

A reclaiming agent is formed by grafting thiol groups onto styrene-butadiene rubber (SBR). The reclaiming agent has a weight average molecular weight of 1000 to 120000, which can be a random copolymer or a block copolymer. 100 parts by weight of styrene-butadiene rubber can be reacted with 0.1 to 50 parts by weight of the reclaiming agent to form a reclaimed rubber.

9 Claims, No Drawings

RECLAIMING AGENT AND RECLAIMED RUBBER

CROSS REFERENCE TO RELATED APPLICATIONS

The present application is based on, and claims priority from, Taiwan Application Serial Number 111100532, filed on Jan. 6, 2022, the disclosure of which is hereby incorporated by reference herein in its entirety.

TECHNICAL FIELD

The technical field is related to a reclaimed rubber, and in particular it is related to a reclaiming agent for the reclaimed rubber.

BACKGROUND

Waste tires from motor vehicles, as well as waste rubber, defective products, scrap, and other waste rubber materials resulted from the manufacturing process in the rubber industry are increasing year by year. If these waste rubber materials are incinerated, piled up, or buried, it will cause serious environmental pollution and harm to people's health. In addition, the rising cost of waste transportation also places a considerable burden on production costs. In view of these points, the development of recycling application technologies of waste rubber, and converting waste rubber into new sources of recyclable materials should be accelerated to lower the natural resource consumption, reduce environmental pollution, and improve the quality of the living environment. These issues should be actively responded to by the rubber-related industry. Accordingly, a reclaiming agent should be developed to lower the energy used in the process, enhance the remanufacturing quality of the rubber, and increase the applicability of the reclaimed rubber, especially to improve the remanufacturing quality of styrene-butadiene rubber and increase the applicability of the reclaimed styrene-butadiene rubber.

SUMMARY

One embodiment of the disclosure provides a reclaiming agent, formed by grafting thiol groups onto styrene-butadiene rubber.

One embodiment of the disclosure provides a reclaimed rubber, formed by reacting 100 parts by weight of a first styrene-butadiene rubber with 0.1 to 50 parts by weight of a reclaiming agent, wherein the reclaiming agent is formed by grafting thiol groups onto a second styrene-butadiene rubber.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a reclaiming agent, formed by grafting thiol groups onto styrene-butadiene rubber. For example, the styrene-butadiene rubber is firstly reacted with thioacetic acid, thereby grafting thioacetic acid onto the styrene-butadiene rubber.

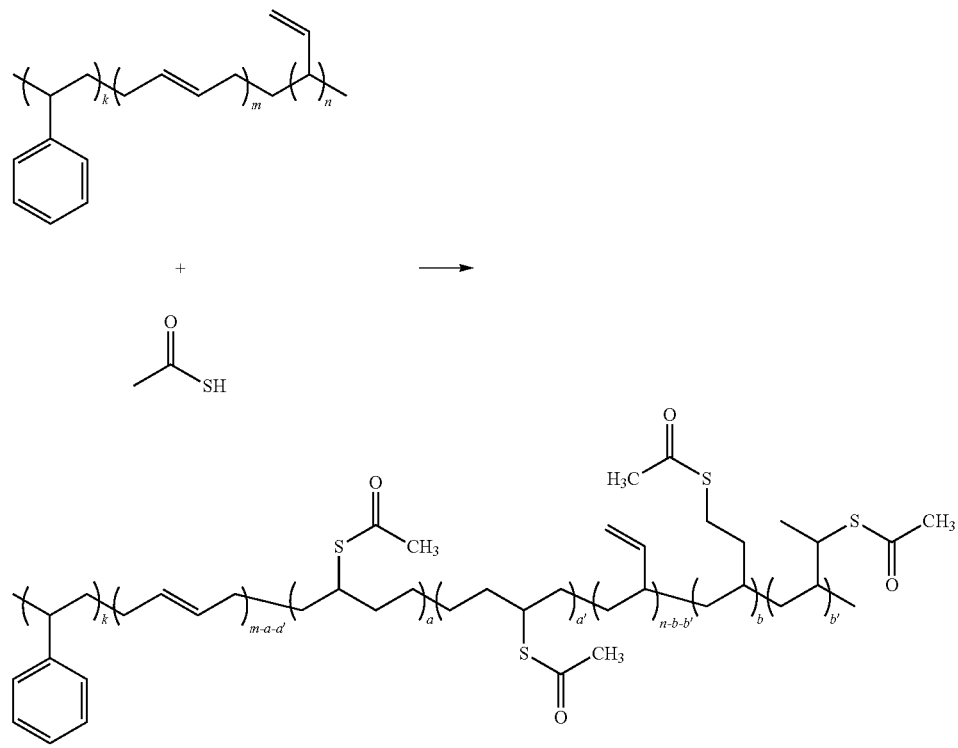

Subsequently, alkaline solution such as sodium hydroxide aqueous solution can be adopted to deprotect the thioacetic acid grafted onto the styrene-butadiene rubber, thereby forming the thiol groups.

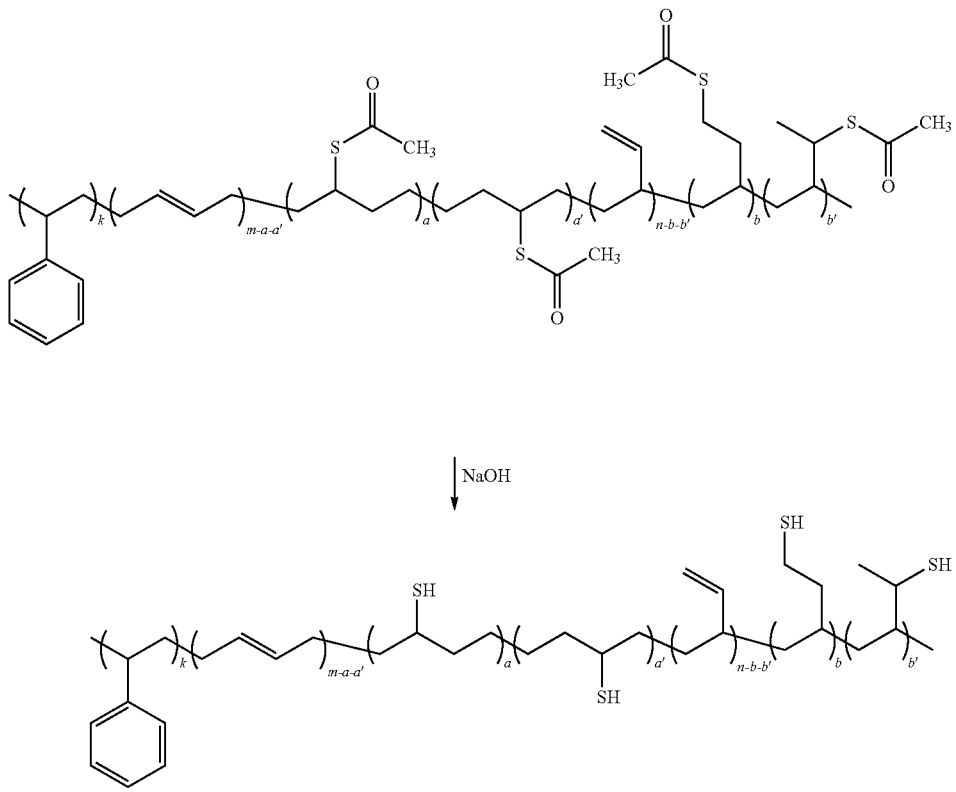

In the above formula, k:(m+n)=0.3:1 to 8:1, such as 0.4:1 to 7.5:1. If k is too little, the structural difference between the reclaiming agent and the styrene-butadiene rubber will be too much, and the mechanical properties of the reclaimed rubber after being further vulcanized will be poor. If k is too much, the double bonds for sulfurization will be insufficient, and the structural difference between the reclaiming agent and the styrene-butadiene rubber will be too much. As such, the reaction effect of the reclaiming agent and the styrene-butadiene rubber will be poor, and the properties of the reclaimed rubber are further degraded compared to the reclaimed rubber without using the reclaiming agent. In the above formula, (a+a'+b+b'):(m+n)=0.01:1 to 0.5:1, such as 0.025:1 to 0.4:1, which means that the ratio of the thiol groups grafted onto the styrene-butadiene rubber (e.g. the sulfurization ratio) is about 1% to 50%. If the ratio of the thiol groups grafted onto the styrene-butadiene rubber is too low, the reclaiming effect of the vulcanized rubber will be poor, and the mechanical properties of the reclaimed rubber will be lowered. In the above formula, the ratio of m and n depends on the polymerization mechanism (e.g. 1,4-addition or 1,2-addition), which can be determined by the copolymerization factors in practice.

It should be understood that the thioacetic acid can be replaced with thiobenzoic acid (Ph-C(=O)—SH) or the like, and the sodium hydroxide can be replaced with potassium hydroxide or the like.

In some embodiments, the reclaiming agent has a weight average molecular weight of 1000 to 120000. If the weight average molecular weight of the reclaiming agent is too low, the reclaiming agent will be easily cracked and volatilized to produce a lot of stench. If the weight average molecular weight of the reclaiming agent is too high, the reaction effect of the reclaiming agent and the styrene-butadiene rubber will be poor and the mechanical properties of the reclaimed rubber will be lowered. For example, the styrene-butadiene rubber can be a random copolymer or a block copolymer.

One embodiment of the disclosure provides a reclaimed rubber, formed by reacting 100 parts by weight of a first styrene-butadiene rubber with 0.1 to 50 parts by weight (e.g. 0.1 to 20 parts by weight) of a reclaiming agent, wherein the reclaiming agent is formed by grafting thiol groups onto a second styrene-butadiene rubber. In some embodiments, the first styrene-butadiene rubber can be the same as the second styrene-butadiene rubber, such as their repeating numbers corresponding to the styrene (e.g. k), their repeating numbers corresponding to the butadiene (e.g. m and n), and/or their weight average molecular weights are the same, but be not limited thereto. Alternatively, the first styrene-butadiene rubber can be different from the second styrene-butadiene rubber, such as their repeating numbers corresponding to the styrene (e.g. k), the repeating numbers corresponding to the butadiene (e.g. m and n), and/or the weight average molecular weights are different, but be not limited thereto. If the reclaiming agent amount is too little, the quality of the reclaimed rubber cannot be improved. If the reclaiming agent amount is too much, the reclaimed rubber will have an excellent quality, however, it cannot continue to improve the quality but increase the cost after reaching a certain amount of reclaiming agent. For example, the waste rubber and the reclaiming agent can be combined by a known method in this field (such as combining the reclaiming agent and thermo mechanical mixing) to reclaim the rubber. In some embodiments, the waste rubber is vulcanized and cross-linked rubber. The method of thermo mechanical mixing the reclaiming agent and the waste rubber often includes mechanical processing in a mixer or an extruder at a reaction temperature for a proper period. The proper period of the thermal mechanical processing depends on the operation conditions, component volume, and component properties. For example, the thermo mechanical processing period can be 1 minute to 60 minutes. In one embodiment, the reaction temperature is 180° C. to 260° C. If the reaction temperature is too low, the reaction period will be extended or even fail to react the reclaiming agent with the styrene-butadiene rubber. If the reaction temperature is too high, it will over react and degrade the properties of the reclaimed rubber (e.g. lowering the tensile strength and the elongation rate).

In some embodiments, the reclaimed rubber can be further vulcanized. For example, sulfur or another vulcanizer can be added to vulcanize the reclaimed rubber on the basis of the requirements, thereby further modifying the properties of the reclaimed rubber to achieve the required specifications of the product. In addition, the reclaimed rubber and the fresh rubber can be mixed. Regardless of whether the reclaimed rubber is mixed with the fresh rubber or not, the reclaimed rubber can be used in fresh rubber applications such as tires.

Below, exemplary embodiments will be described in detail so as to be easily realized by a person having ordinary knowledge in the art. The inventive concept may be embodied in various forms without being limited to the exemplary embodiments set forth herein.

EXAMPLES

Synthesis Example 1-1 (Sulfurization Ratio of 35%)

45 g of styrene-butadiene rubber (SBR, 4270 commercially available from TSRC corporation) was added to 300 mL of toluene, and then heated to 80° C. with stirring and refluxed for 2 hours until the styrene-butadiene rubber was completely dissolved. 6.6 mL of thioacetic acid was added to the styrene-butadiene rubber solution, and reflux at 80° C. with stirring to react for 48 hours. After the reaction was finished, the solution color changed from colorless to a pale red. The reaction is shown below:

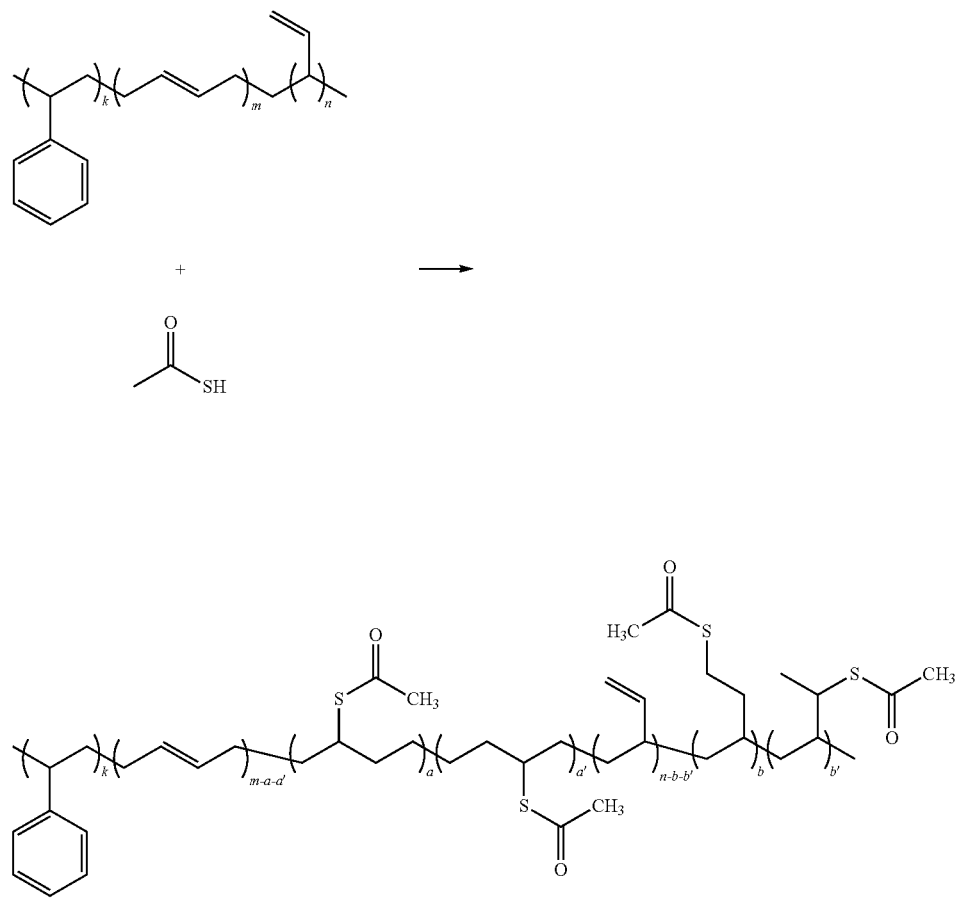

In the above formula, k:(m+n) is about 32:68, and m:n is about 8:1. (a+a'+b+b'):(m+n) is about 0.35:1, which is the ratio of the thioacetic acid grafted onto the styrene-butadiene rubber (calculated from the $^1$H NMR spectrum).

Subsequently, 0.5 g of NaOH was dissolved in 50 mL of water, and the NaOH aqueous solution was added to the above solution, and refluxed at 80° C. with stirring at 600 rpm for 24 hours. The solution color changed from pale red to white. The reaction is shown below:

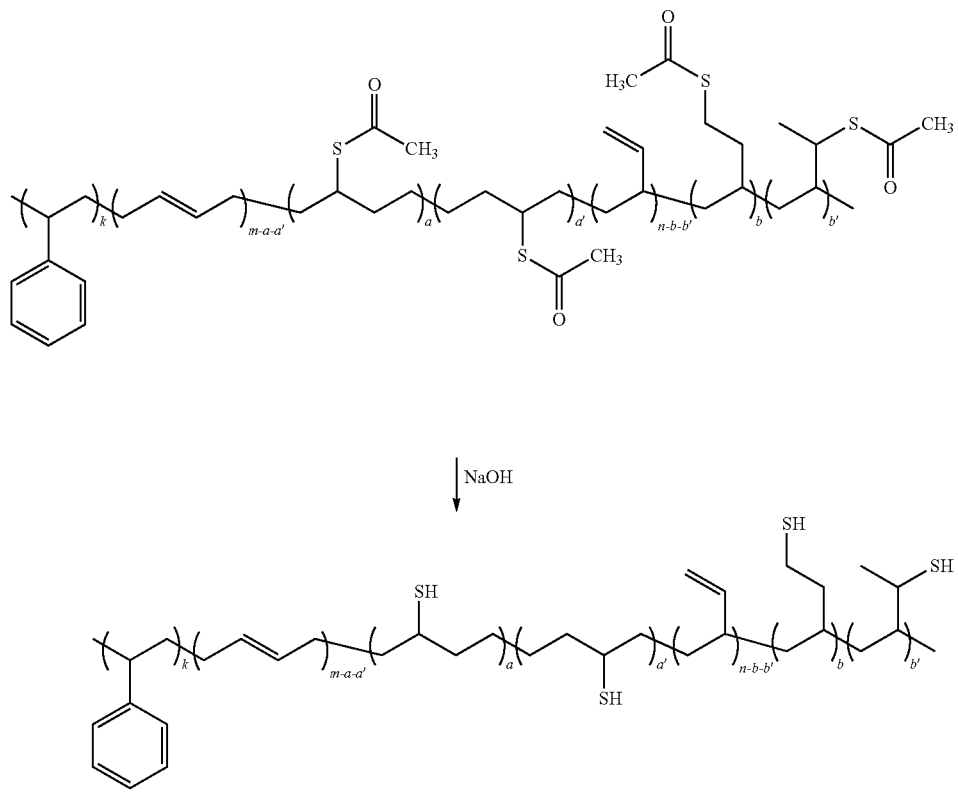

The reaction is so-called de-protection reaction. After the reaction, the styrene-butadiene rubber having the thiol groups grafted thereon could be obtained.

The styrene-butadiene rubber having the thiol groups grafted thereon was then poured into 600 mL of ethanol with stirring at 200 rpm, then filtered to remove the solvent, then stood in hood for 72 hours, and then put into a vacuum oven to be vacuumed and baked at 50° C. for 72 hours, thereby obtaining a white yellow bulk product. The white yellow bulk product was cracked to obtain white yellow powder, and then analyzed by NMR to verify the ratio of thiol group grafted onto the styrene-butadiene rubber (the sulfurization ratio, e.g. (a+a'+b+b'):(m+n) was about 0.35:1).

Synthesis Example 2-1 (Sulfurization Ratio of 14.7%)

Synthesis Example 2-1 was similar to Synthesis Example 1-1, and the differences in Synthesis Example 2-1 were the amount of thioacetic acid being decreased from 6.6 mL to 3.3 mL, and the styrene-butadiene rubber being replaced from the 4270 (from TSRC) being replaced with E1502 (from TSRC). The other reaction steps and the amounts of the other reactors in Synthesis Example 2-1 were similar to those in Synthesis Example 1-1. Finally, the styrene-butadiene rubber having the thiol groups grafted thereon was obtained. In Synthesis Example 2-1, k:(m+n) is about 87:13, and m:n is about 1:0.175. (a+a'+b+b'):(m+n) is about 0.147:1, which is the ratio of the thioacetic acid grafted onto the styrene-butadiene rubber (calculated from the $^1$H NMR spectrum).

Synthesis Example 2-2 (Sulfurization Ratio of 12.7%)

Synthesis Example 2-2 was similar to Synthesis Example 1-1, and the differences in Synthesis Example 2-2 were the amount of thioacetic acid being decreased from 6.6 mL to 1.65 mL, and the styrene-butadiene rubber being replaced from the 4270 (from TSRC) being replaced with E1502 (from TSRC). The other reaction steps and the amounts of the other reactors in Synthesis Example 2-2 were similar to those in Synthesis Example 1-1. Finally, the styrene-butadiene rubber having the thiol groups grafted thereon was obtained. In Synthesis Example 2-2, k:(m+n) is about 87:13, and m:n is about 1:0.175. (a+a'+b+b'):(m+n) is about 0.127:1, which is the ratio of the thioacetic acid grafted onto the styrene-butadiene rubber (calculated from the $^1$H NMR spectrum).

Synthesis Example 2-3 (Sulfurization Ratio of 7%)

Synthesis Example 2-3 was similar to Synthesis Example 1-1, and the differences in Synthesis Example 2-3 were the amount of thioacetic acid being decreased from 6.6 mL to 0.99 mL, and the styrene-butadiene rubber being replaced from the 4270 (from TSRC) being replaced with E1502 (from TSRC). The other reaction steps and the amounts of the other reactors in Synthesis Example 2-3 were similar to those in Synthesis Example 1-1. Finally, the styrene-butadiene rubber having the thiol groups grafted thereon was obtained. In Synthesis Example 2-3, k:(m+n) is about 87:13, and m:n is about 1:0.175. (a+a'+b+b'):(m+n) is about 0.07:1, which is the ratio of the thioacetic acid grafted onto the styrene-butadiene rubber (calculated from the $^1$H NMR spectrum).

Synthesis Example 2-4 (Sulfurization Ratio of 4.5%)

Synthesis Example 2-4 was similar to Synthesis Example 1-1, and the differences in Synthesis Example 2-4 were the amount of thioacetic acid being decreased from 6.6 mL to 0.66 mL, and the styrene-butadiene rubber being replaced from the 4270 (from TSRC) being replaced with E1502 (from TSRC). The other reaction steps and the amounts of the other reactors in Synthesis Example 2-4 were similar to those in Synthesis Example 1-1. Finally, the styrene-butadiene rubber having the thiol groups grafted thereon was obtained. In Synthesis Example 2-4, k:(m+n) is about 87:13, and m:n is about 1:0.175. (a+a'+b+b'):(m+n) is about 0.045:1, which is the ratio of the thioacetic acid grafted onto the styrene-butadiene rubber (calculated from the $^1$H NMR spectrum).

Synthesis Example 2-5 (Sulfurization Ratio of 2.8%)

Synthesis Example 2-5 was similar to Synthesis Example 1-1, and the differences in Synthesis Example 2-5 were the amount of thioacetic acid being decreased from 6.6 mL to 0.33 mL, and the styrene-butadiene rubber being replaced from the 4270 (from TSRC) being replaced with E1502 (from TSRC). The other reaction steps and the amounts of the other reactors in Synthesis Example 2-5 were similar to those in Synthesis Example 1-1. Finally, the styrene-butadiene rubber having the thiol groups grafted thereon was obtained. In Synthesis Example 2-5, k:(m+n) is about 87:13, and m:n is about 1:0.175. (a+a'+b+b'):(m+n) is about 0.028:1, which is the ratio of the thioacetic acid grafted onto the styrene-butadiene rubber (calculated from the $^1$H NMR spectrum).

Example 1

40 g of 3 mm waste styrene-butadiene rubber (commercially available from Polygreen Resources Co., Ltd.) and 2 phr of the product in Synthesis Example 1-1 serving as a reclaiming agent were added into a plastometer (Plasticorder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (17%, analyzed according to the standard ASTM5667) and its de-crosslinking degree (83%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (9.75 MPa) and elongation rate (114%).

Example 2

Example 2 was similar to Example 1, and the differences in Example 2 were the waste styrene-butadiene rubber being commercially available from Kuang Shean Enterprises Co. Ltd., and the waste styrene-butadiene rubber reacted with the reclaiming agent at 210° C. and 70 rpm for 10 minutes to obtain a reclaimed rubber. The steps of preparing the reclaimed rubber and the sheet were the same as those in Example 1. 10 g of the sheet was analyzed to measure its solute content (17%, analyzed according to the standard ASTM5667) and its de-crosslinking degree (81%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (8.28 MPa) and elongation rate (212%).

Example 3

40 g of 3 mm waste styrene-butadiene rubber (commercially available from Polygreen Resources Co., Ltd.) and 2 phr of the product in Synthesis Example 2-1 serving as a reclaiming agent were added into a plastometer (Plasticorder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (25%, analyzed according to the standard ASTM5667) and its de-crosslinking degree (79%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (7.34 MPa) and elongation rate (125%).

Example 4

40 g of 3 mm waste styrene-butadiene rubber (commercially available from Polygreen Resources Co., Ltd.) and 2 phr of the product in Synthesis Example 2-2 serving as a reclaiming agent were added into a plastometer (Plasticorder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (25%, analyzed according to the standard ASTM5667) and its de-crosslinking degree (76%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS 1(6313-2012), which was analyzed to measure its tensile strength (6.69 MPa) and elongation rate (119%).

Example 5

40 g of 3 mm waste styrene-butadiene rubber (commercially available from Polygreen Resources Co., Ltd.) and 2 phr of the product in Synthesis Example 2-3 serving as a reclaiming agent were added into a plastometer (Plasticorder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (27%, analyzed according to the standard ASTM5667) and its de-crosslinking degree (75%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (6.56 MPa) and elongation rate (104%).

Example 6

40 g of 3 mm waste styrene-butadiene rubber (commercially available from Polygreen Resources Co., Ltd.) and 2 phr of the product in Synthesis Example 2-4 serving as a reclaiming agent were added into a plastometer (Plasti-corder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (28%, analyzed according to the standard ASTM5667) and its de-crosslinking degree (75%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (5.75 MPa) and elongation rate (97%).

Example 7

40 g of 3 mm waste styrene-butadiene rubber (commercially available from Polygreen Resources Co., Ltd.) and 2 phr of the product in Synthesis Example 2-5 serving as a reclaiming agent were added into a plastometer (Plasti-corder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (30%, analyzed according to the standard ASTM5667) and its de-crosslinking degree (71%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (5.32 MPa) and elongation rate (92%).

Comparative Example 1-1

40 g of waste rubber from truck and bus tires (commercially available from Polygreen Resources Co., Ltd.) and 8 phr of TDAE (commercially available from CPC Corporation, Taiwan) rubber processing oil serving as a reclaiming agent were added into a plastometer (Plasti-corder PL2000) to react at 180° C. and 70 rpm for 10 minutes to obtain a reclaimed rubber. The definition of "phr" is adding 1 g additive (e.g. the reclaiming agent) per 100 g of sample (e.g. the waste rubber), and 8 phr means adding 8 g of the additive per 100 g of the sample. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (32%, analyzed according to the standard ASTM5667) and its de-crosslinking degree (80%, analyzed according to the standard ASTM6814-02). 100 g of the sheet was then vulcanized by adding vulcanizing agent according to JIS standard (JIS 1(6313-2012), and the vulcanized sheet was hot-pressed and molded according to JIS standard (JIS K6313-2012), which was analyzed to measure its tensile strength (5.99 MPa) and elongation rate (61%).

Comparative Example 1-2

40 g of waste rubber from truck and bus tires (commercially available from Kuang Shean Enterprises Co. Ltd) and 8 phr of TDAE (commercially available from CPC Corporation, Taiwan) rubber processing oil serving as a reclaiming agent were added into a plastometer (Plasti-corder PL2000) to react at 210° C. and 70 rpm for 10 minutes to obtain a reclaimed rubber. The steps of preparing the sheet were similar to those in Comparative Example 1-1. 10 g of the sheet was analyzed to measure its solute content (25%, analyzed according to the standard ASTM5667) and its de-crosslinking degree (78%, analyzed according to the standard ASTM6814-02). 100 g of the sheet was then vulcanized by adding vulcanizing agent according to JIS standard (JIS 1(6313-2012), and the vulcanized sheet was hot-pressed and molded according to JIS standard (JIS K6313-2012), which was analyzed to measure its tensile strength (6.12 MPa) and elongation rate (155%).

Comparative Example 2

40 g of waste styrene-butadiene rubber from truck and bus tires (commercially available from Polygreen Resources Co., Ltd.) and 2 phr of diphenyl disulfide (DPDS) serving as a reclaiming agent were added into a plastometer (Plasti-corder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (31%, analyzed according to the standard ASTM5667) and its de-crosslinking degree (78%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (6.06 MPa) and elongation rate (98%).

Comparative Example 3

40 g of 3 mm waste styrene-butadiene rubber (commercially available from Polygreen Resources Co., Ltd.) and 2 phr of product of Synthesis Example 1 in Taiwan Patent Application No. TW110100391 serving as a reclaiming agent were added into a plastometer (Plasti-corder PL2000) to react at 180° C. and 70 rpm for 10 minutes to obtain a reclaimed rubber. The reaction was repeated 3 times to obtain totally about 120 g of the reclaimed rubber, and then refined by a twin-roller at 40° C. and 30 rpm for 10 minutes to form a sheet. 10 g of the sheet was analyzed to measure its solute content (24%, analyzed according to the standard ASTM5667) and its de-crosslinking degree (75%, analyzed according to the standard ASTM6814-02). 100 g of the sheet was then vulcanized by adding vulcanizing agent according to JIS standard (JIS K6313-2012), and the vulcanized sheet was hot-pressed and molded according to JIS standard (JIS K6313-2012), which was analyzed to measure its tensile strength (8.28 MPa) and elongation rate (112%).

TABLE 1

|  | Tensile strength (MPa) | Elongation rate (%) |
|---|---|---|
| Example 1 | 9.75 | 114 |
| Example 2 | 8.28 | 212 |
| Example 3 | 7.34 | 125 |
| Example 4 | 6.69 | 119 |
| Example 5 | 6.56 | 104 |
| Example 6 | 5.75 | 97 |
| Example 7 | 5.32 | 92 |
| Comparative Example 1-1 | 5.99 | 61 |
| Comparative Example 1-2 | 6.12 | 155 |
| Comparative Example 2 | 6.06 | 98 |
| Comparative Example 3 | 8.28 | 112 |

As shown in Table 1, reclaimed rubber formed by reacting the reclaiming agent of the disclosure with the styrene-butadiene rubber had higher tensile strength or elongation rate than those of the reclaimed rubber formed by reacting the conventional reclaiming agent with the styrene-butadiene rubber.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A reclaiming agent, having a chemical structure of

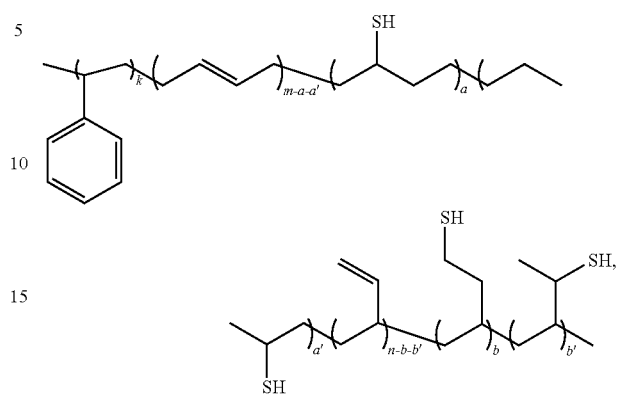

wherein k: (m+n)=0.3:1 to 8:1, and (a+a'+b+b'): (m+n) =0.01:1 to 0.5:1.

2. The reclaiming agent as claimed in claim 1, having a weight average molecular weight of 1000 to 120000.

3. The reclaiming agent as claimed in claim 1, wherein the styrene-butadiene rubber is a random copolymer or a block copolymer.

4. A reclaimed rubber,
formed by reacting 100 parts by weight of a first styrene-butadiene rubber with 0.1 to 50 parts by weight of a reclaiming agent,
wherein the reclaiming agent is formed by grafting thiol groups onto a second styrene-butadiene rubber.

5. The reclaimed rubber as claimed in claim 4, wherein the reclaiming agent has a chemical structure of

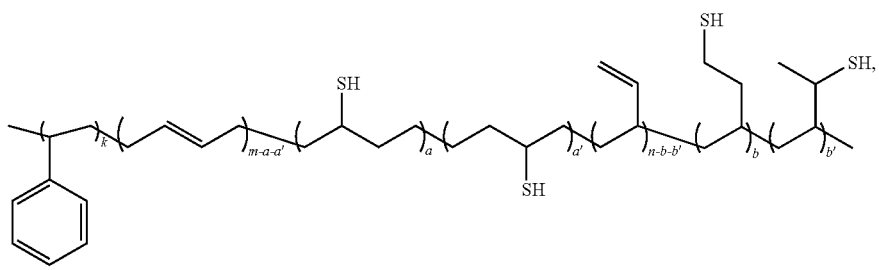

wherein k: (m+n)=0.3:1 to 8:1, and (a+a'+b+b'): (m+n)=0.01:1 to 0.5:1.

6. The reclaimed rubber as claimed in claim 4, wherein the reclaiming agent has a weight average molecular weight of 1000 to 120000.

7. The reclaimed rubber as claimed in claim 4, wherein the first styrene-butadiene rubber is a random copolymer or a block copolymer.

8. The reclaimed rubber as claimed in claim 4, wherein the first styrene-butadiene rubber is the same as the second styrene butadiene-rubber.

9. The reclaimed rubber as claimed in claim 4, wherein the first styrene-butadiene rubber is different from the second styrene butadiene-rubber.

* * * * *